UNITED STATES PATENT OFFICE.

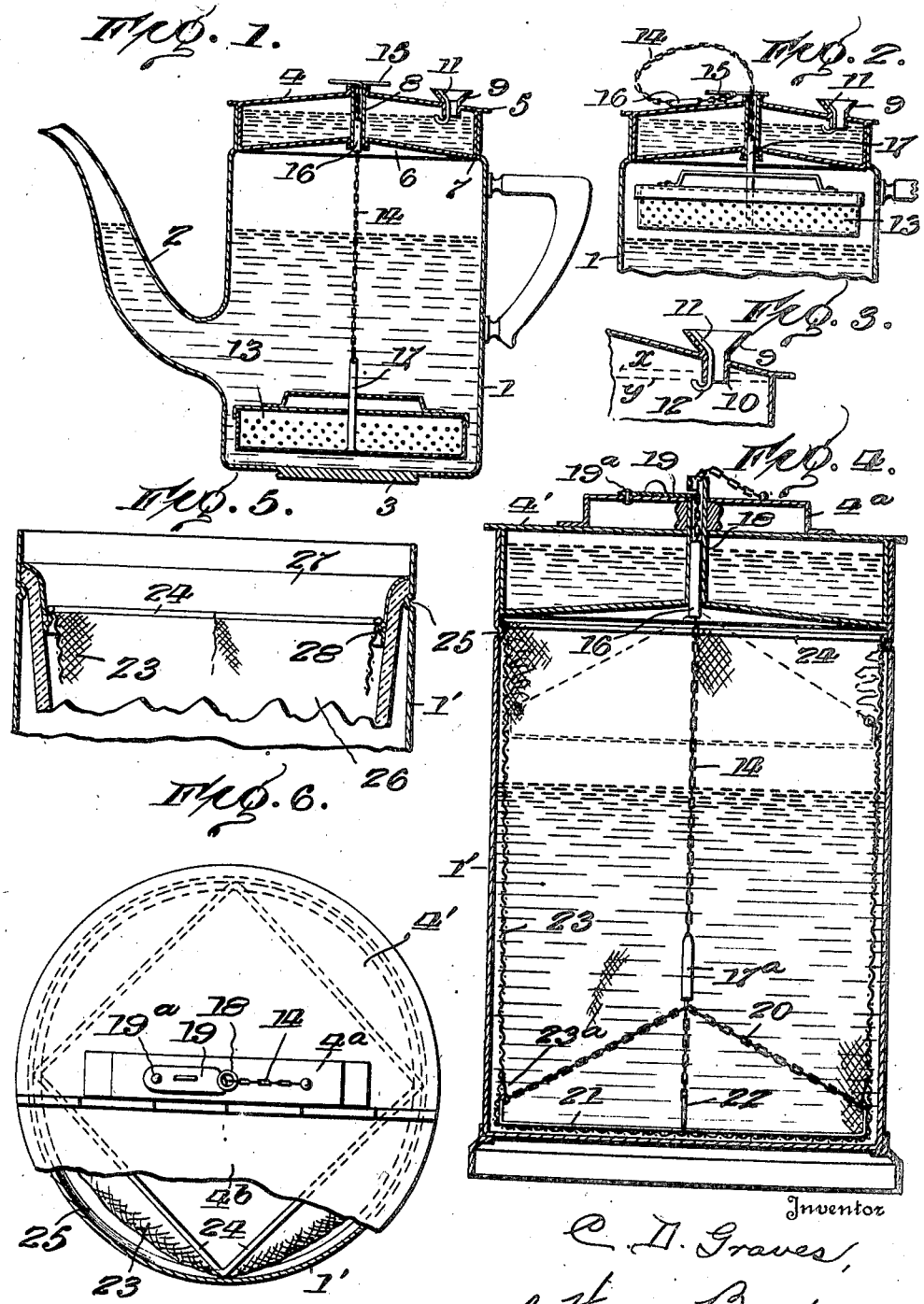

CLARENCE D. GRAVES, OF DUBLIN, GEORGIA.

COFFEE POT OR URN.

1,417,243.     Specification of Letters Patent.     Patented May 23, 1922.

Application filed August 30, 1921. Serial No. 496,892.

*To all whom it may concern:*

Be it known that I, CLARENCE D. GRAVES, a citizen of the United States, residing at Dublin, county of Laurens, State of Georgia, have invented certain new and useful Improvements in Coffee Pots or Urns, of which the following is a specification.

This invention relates to pots or urns for making decoctions of coffee, tea, and the like.

As is well known, the coffee bean for example, contains, among other things, certain essential oils which give to the prepared beverage its flavor or aroma, and also considerable quantities of tannin or tannic acid and caffein, which, if allowed to go into solution to too great an extent, impart to the liquid coffee a disagreeable taste, and render the same injurious to health.

In pots or urns as ordinarily constructed, the essential oils, being volatile, escape with the steam, as the coffee is boiled, thus depriving the beverage of much of its aroma, while, at the same time, the prolonged action of the boiling liquid on the ground coffee serves to extract therefrom an objectionable amount of tannin and caffein.

The primary object of the present invention is, therefore, to provide a pot or urn having means for preventing the escape of the essential oils or aroma, and at the same time so constructed as to make possible the removal of the coffee grounds or the like from the hot liquid after the desired amount of tannin and caffein has been extracted. To this end, I propose to arrange a condenser in the upper part of the pot or vessel, so constructed as to condense and return to the liquid the vaporized essential oils which pass off with the steam, and to provide a pull chain, or the like, passing down through said condenser, by means of which a receptacle containing the solid material may be raised out of the liquid, as desired.

Another object of the invention is to provide, in connection with such a condenser, signal means for indicating to the attendant when a pot of coffee or the like has boiled approximately long enough.

In order that the invention may be readily understood, reference is had to the accompanying drawings, forming part of this specification, and in which:—

Fig. 1 is a vertical sectional view through a coffee pot equipped with my improved condenser and coffee container, and showing the container in its lowered or operative position;

Fig. 2 is a sectional elevation of the upper part of the same, showing the container in its elevated or inoperative position;

Fig. 3 is a fragmentary vertical section on an enlarged scale, showing the condenser illustrated in Figs. 1 and 2.

Fig. 4 is a vertical section through a coffee urn embodying my improvement;

Fig. 5 is a fragmentary vertical section through the upper part of a modified construction of urn, and Fig. 6 is a plan view of the urn shown in Fig. 4, parts being broken away to show the coffee bag.

Referring to the drawings in detail, 1 designates a coffee pot, the body of which may be of the usual or any desired construction. This pot is shown as provided with a spout 2, and as having a relatively small heating surface 3, at the bottom.

In the upper end of the coffee pot is fitted my improved condenser which is designated as a whole by the reference character 4. This condenser consists of a cylindrical reservoir adapted to fit snugly within the body of the coffee pot and provided with a rim or flange 5, adapted to rest upon the upper edge of the pot and support the condenser. The condenser is provided with a concave or conical bottom 6, constituting the condensing surface, and this forms with the side walls a relatively sharp edge 7 as shown in Fig. 5, from which edge the products of condensation drip.

Passing centrally through the condenser 4 and tightly sealed relative thereto, is a vertical tube 8 open at both ends.

In order to fill the condenser with cold water or other suitable cooling medium, I provide a funnel 9, permanently set in the upper wall of the condenser and provided with a neck or tube 10, extending downwardly into the condenser a short distance, as clearly shown in Fig. 3. This funnel may be of any desired shape, and may be set with its upper edge flush with the top of the condenser, if desired. In order to permit the free escape of air during the filling operation, I preferably provide a small tube 11, secured to the funnel and passing down inside of the same, the inner end of such tube being bent upwardly as indicated at 12. It will be obvious that as water is poured into the condenser, the contained air will escape through the tube 11 until the water level reaches the point indicated by the line $y$. Preferably, the condenser is filled slightly above this point to a level, such for example, as indicated by the line $x$, so that the end of the tube 12 is covered and communication between the air space in the condenser and the outside atmosphere is shut off.

When the end of the tube is thus covered, the funnel may be filled to the top with water, and then by slightly tilting the condenser, enough air will escape to permit this water to enter. Thus, by repeating this process, the volume of confined air may be reduced to any desired extent, and the timing varied accordingly.

A container 13 of perforated metal, wire mesh, fabric or the like is provided, for the purpose of containing the ground coffee or other solid matter from which the beverage is to be made. This is suspended in the coffee pot by means of a chain 14 or the like, passing downwardly through the tube 8, and secured at its lower end to a stem 17, supporting the container. This chain is preferably attached at its outer end to a cross bar or yoke 15 which engages the end of the tube 8 as shown in Fig. 1, and limits the downward movement of the container 13.

In order to prevent the escape of the vapors or volatile matter through the tube 8, I interpose in the chain 14 at a suitable point, a plug 16, such plug 16 serving to effectively close the tube when the container is in its lowered position as shown in Fig. 1, and the stem 17 serving to close the tube when the container is in its raised position, as shown in Fig. 2.

In operation, the condenser is filled with cold water or the like as above described, so as to leave an air space in the upper part of the condenser, the solid material such as ground coffee is placed in the container 13 and the same is lowered into the water in the coffee pot, as shown in Fig. 1. Heat is then applied and eventually the water in the pot is raised to the boiling temperature. The soluble contents of the coffee grounds are extracted and the volatile material, including the essential oils constituting aroma, pass off with the steam. These volatile vapors strike the relatively cold condensing surface 6 and are there condensed, trickling outward along such surface and dripping from the edge 7 back into the pot. Thus the escape of the essential oils and volatile material is prevented and the full aroma of the beverage thus preserved. After the container 13 has remained in the liquid for a sufficient length of time to extract the desired quantities of tannin, caffein, and other substances, the container is raised to the elevated position, shown in Fig. 2, clear of the liquid, in which position it is retained by thrusting one end of the bar 15 through a link of the chain 14 and permitting such bar to rest upon the upper end of the tube 8, as shown in Fig. 2.

As the liquid in the pot boils and gives off steam, and as such steam is condensed by the condenser, the water in the condenser is gradually heated and with it the air contained in the air space thereof. As the temperature rises higher and higher, this confined air expands and the expansion continues until sufficient pressure is generated to force the water in the condenser up through the tube 10 and out of the funnel 9, from which it over-flows. This over-flowing of the water from the condenser, especially if such water falls upon a heated stove or the like, serves as a signal to indicate to the attendant that the coffee has boiled long enough and that the container should be elevated and the pot or vessel removed to a position of lower heat. In this position the residue of essential oils will be driven out of the solid matter, condensed and delivered in to the liquid coffee. Thus the reservoir 4 serves the double purpose of a condenser and a heat responsive, time controlled signal device.

My improvements can also be applied to the type of coffee urn commonly used in hotels and restaurants, and in Figs. 4 and 6, I have illustrated my invention as applied to such an urn. Referring to these figures, the urn, which is designated $i'$, may be of any desired construction. At the upper end thereof, in place of the usual cover, is fitted my improved condenser 4', which may be quite similar to the condenser 4 above described. The condenser is preferably provided with a central hand-hold 4ª, by which it may be lifted, and a tube 18 extends vertically through the center thereof. In this construction, the above described signal device is not shown, and instead of the funnel 9, I provide the condenser with a hinged lid 4ᵇ through which it may be filled.

The coffee container in this case is shown as a bag 23 of suitable textile material and this bag is attached at its upper end to a ring or frame 24 supported on an annular bead 25. The frame 24 is preferably made square as shown in Fig. 6, so that only its corners are in contact with the body of the urn, thus providing a free space through which the condensed liquid may drip. The chain 14 is attached to the bottom of the bag by any suitable means. As shown in Fig. 4, there is provided a frame formed of a pair of crossed wires 21 and 22, the ends of which are attached to the chain 14 by means of side chains 20. The bag itself is attached to the frame wires 21 and 22 by means of suitable hooks 23ª. In the chain are interposed plugs 16 and 17ª for closing the tube 18 when the bag is in either its lower or upper position.

While I have shown this particular method of attaching the hoisting chain to the bottom of the bag, it will be understood that the details of such a connection can be widely varied without departing from the spirit of the invention, and many other equivalent arrangements can be employed.

Instead of providing a yoke or cross bar such as 15 to support the chain when the bag is elevated, I may provide a clip or catch 19 pivoted at 19ª on top of the hand-hold, and so arranged as to enter a slot in the tube 18 and engage and hold the chain in any desired position. In Fig. 4, I have shown in dotted lines the position of the bag when elevated.

In Fig. 5, I have illustrated a modified form of coffee urn which is also in common use. In this modification, a stone or earthenware jar 26 is provided to contain the liquid coffee, and in order to furnish means for supporting the ring 24 within such jar, I provide a sheet metal collar 27, seating on the upper edge of the jar, and formed with an annular bead or shoulder 28, on which the ring 24 rests.

It will thus be seen that I have provided a combined arrangement of condenser and container so constructed that the container may be raised or lowered at will, while at the same time the escape of volatile vapors is prevented and such vapors condensed and returned to the liquid in the vessel, and it is thought that the many advantages of my invention will be readily appreciated without further discussion.

What I claim is:—

1. A vessel for preparing decoctions having a condenser mounted in the upper portion thereof, a receptacle in said vessel adapted to contain solid material, a chain or the like by means of which the solid material may be raised and lowered, and a tube extending through said condenser, through which tube said chain passes.

2. A vessel for preparing decoctions having a condenser mounted in the upper portion thereof, a tube extending through said condenser and open at both ends, a receptacle in said vessel adapted to contain solid material, a chain or the like for raising and lowering the bottom of said receptacle, said chain passing through said tube, and means carried by said chain for closing said tube and preventing the escape of vapors therethrough.

3. A vessel for preparing decoctions having a condenser mounted in the upper portion thereof, a tube extending through said condenser and open at both ends, a receptacle in said vessel adapted to contain the solid material, a chain or the like for raising and lowering the bottom of said receptacle, said chain passing through said tube, and means carried by said chain for closing said tube in both the upper and lower positions of said receptacle.

4. A vessel for preparing decoctions comprising a cylindrical container for the liquid, and a bag adapted to receive the solid material, an angular frame to which the upper edge of the bag is secured, and an annular shoulder on the liquid container on which the corners of such frame are supported.

5. A vessel for preparing decoctions comprising a cylindrical container for the liquid, a condenser mounted in the upper part thereof, a bag adapted to receive the solid material, a frame to which the upper edge of the bag is secured, and means for supporting said frame below the condenser, said frame being polygonal, whereby a free space is provided between its sides and the walls of the container to permit the condensed liquid to drip back into the decoction.

In testimony whereof I affix my signature.

CLARENCE D. GRAVES.